(12) United States Patent
Niki et al.

(10) Patent No.: US 11,427,690 B2
(45) Date of Patent: Aug. 30, 2022

(54) AIR FILTER MEDIUM, AIR FILTER PACK, AND AIR FILTER UNIT

(71) Applicant: NITTO DENKO CORPORATION, Osaka (JP)

(72) Inventors: Takashi Niki, Osaka (JP); Masaaki Mori, Osaka (JP); Shiho Wada, Osaka (JP); Atsushi Daimon, Osaka (JP); Toshiki Yanagi, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 306 days.

(21) Appl. No.: 16/337,795

(22) PCT Filed: Sep. 25, 2017

(86) PCT No.: PCT/JP2017/034582
§ 371 (c)(1),
(2) Date: Mar. 28, 2019

(87) PCT Pub. No.: WO2018/062112
PCT Pub. Date: Apr. 5, 2018

(65) Prior Publication Data
US 2020/0002495 A1 Jan. 2, 2020

(30) Foreign Application Priority Data

Sep. 30, 2016 (JP) .............................. JP2016-194414

(51) Int. Cl.
| | |
|---|---|
| *B01D 39/16* | (2006.01) |
| *B01D 71/36* | (2006.01) |
| *B01D 63/14* | (2006.01) |
| *B01D 69/02* | (2006.01) |
| *B01D 46/52* | (2006.01) |
| *C08J 9/00* | (2006.01) |

(52) U.S. Cl.
CPC ............ *C08J 9/0004* (2013.01); *B01D 39/16* (2013.01); *B01D 46/52* (2013.01); *B01D 63/14* (2013.01); *B01D 69/02* (2013.01); *B01D 71/36* (2013.01)

(58) Field of Classification Search
CPC ........ C08J 9/0004; B01D 39/16; B01D 46/52; B01D 63/14; B01D 69/02; B01D 71/36;
(Continued)

(56) References Cited

U.S. PATENT DOCUMENTS

| | | | |
|---|---|---|---|
| 5,234,739 A | 8/1993 | Tanaru et al. | |
| 5,409,515 A * | 4/1995 | Yamamoto | ........... B01D 39/163 55/341.1 |

(Continued)

FOREIGN PATENT DOCUMENTS

| | | |
|---|---|---|
| JP | 5-202217 A | 8/1993 |
| JP | 10-505378 A | 5/1998 |

(Continued)

OTHER PUBLICATIONS

Official Communication issued in International Bureau of WIPO Patent Application No. PCT/JP2017/034582, dated Oct. 31, 2017.

*Primary Examiner* — Robert A Hopkins
*Assistant Examiner* — Qianping He
(74) *Attorney, Agent, or Firm* — Greenblum & Bernstein, P.L.C.

(57) ABSTRACT

An air filter medium includes a first porous PTFE membrane and a second porous PTFE membrane. The air filter medium has a first main surface and a second main surface, and the first porous PTFE membrane and the second porous PTFE membrane are arranged so that an air flow moving from the first main surface to the second main surface passes through the first porous PTFE membrane and subsequently through the second porous PTFE membrane. A proportion of areas (Continued)

occupied by the plurality of nodes on a surface of the first porous PTFE membrane is in the range of 1.5 to 3.0% and an average of the areas of the plurality of nodes is 200 μm2 or more.

10 Claims, 7 Drawing Sheets

(58) Field of Classification Search
CPC ........ B01D 71/26; B01D 39/14; B01D 61/00; B29C 55/14
USPC .......................................................... 55/486
See application file for complete search history.

(56) References Cited

U.S. PATENT DOCUMENTS

| | | |
|---|---|---|
| 5,708,044 A | 1/1998 | Branca |
| 2007/0012624 A1* | 1/2007 | Bacino ............... B01D 39/1692 210/500.36 |
| 2013/0186179 A1 | 7/2013 | Osborne |
| 2014/0120286 A1* | 5/2014 | Wendlandt ......... B01D 67/0027 428/36.9 |
| 2017/0128876 A1* | 5/2017 | Shibuya ................. B01D 69/10 |
| 2017/0157568 A1* | 6/2017 | Tsujiwaki .............. B01D 69/02 |
| 2018/0264392 A1 | 9/2018 | Niki et al. |

FOREIGN PATENT DOCUMENTS

| | | |
|---|---|---|
| JP | 2000-42322 A | 2/2000 |
| JP | 2000-300921 A | 10/2000 |
| JP | 2001-170424 A | 6/2001 |
| JP | 2003-190749 A | 7/2003 |
| JP | 2014-500139 A | 1/2014 |
| JP | 2015-186772 A | 10/2015 |
| JP | 2015-226877 A | 12/2015 |
| WO | 96/07529 A1 | 3/1996 |
| WO | 2012/064751 A2 | 5/2012 |
| WO | 2017/056508 A1 | 4/2017 |

* cited by examiner

AIR FILTER MEDIUM, AIR FILTER PACK, AND AIR FILTER UNIT

TECHNICAL FIELD

The present invention relates to an air filter medium including a porous membrane of polytetrafluoroethylene (hereinafter referred to as "PTFE").

BACKGROUND ART

Porous PTFE membranes have been conventionally used as air filter media in a variety of fields. Porous PTFE membranes, which have high dust collection performance, are very suitable for use in a place with a little amount of dust (such as use in a clean room). However, when a porous PTFE membrane is used in an intake air filter for an outdoor air conditioner or turbine to filter out air dust, the porous PTFE membrane may collect air-borne dust only in its surface portion and be consequently clogged, causing an increase in pressure drop. An attempt has thus been made to prevent clogging of a porous PTFE membrane and increase the service life of an air filter medium by disposing an air-permeable member such as a non-woven fabric as a prefilter layer on the upstream side in the air flow direction to collect large particles of dust in advance (Patent Literature 1). However, the air filter medium described in Patent Literature 1 has a problem in that the achievement of the preventive effect on clogging of the porous PTFE membrane requires thickening of the prefilter layer, which leads to a high manufacturing cost. There is also a problem in that thickening of the prefilter layer makes pleating (folding into a series of W-shapes) of the air filter medium difficult.

As a product designed to prevent clogging of porous PTFE membranes with dust, there has been proposed an air filter medium in which a first porous PTFE membrane and a second porous PTFE membrane are stacked, the average pore diameter of the second porous PTFE membrane is larger than the average pore diameter of the first porous PTFE membrane, and the second porous PTFE membrane is disposed upstream of the first porous PTFE membrane in an air flow direction (Patent Literature 2). Patent Literature 2 states that the second porous PTFE membrane functions as a prefilter to collect large-diameter particles of dust, thus reducing the increase in the pressure drop across the air filter medium ([0006]). In the air filter medium of Patent Literature 2, the average pore diameters of the porous PTFE membranes are controlled to reduce the increase in pressure drop, as is evident from the fact that the collection efficiency of the air filter medium is measured using polydisperse dioctyl phthalate (DOP) with a particle diameter of 0.1 to 0.2 µm.

CITATION LIST

Patent Literature

Patent Literature 1: JP 2000-300921 A
Patent Literature 2: JP 2001-170424A

SUMMARY OF INVENTION

Technical Problem

A recent problem concerning air filter media, in particular air filter media for clean rooms intended for medical treatment or pharmaceutical operation, is that not only dust floating in air but also oil mist (oil particles) causes clogging leading to an increase in pressure drop. However, the air filter medium disclosed in Patent Literature 2 is not adapted to resist clogging with oil mist.

It is an object of the present invention to provide an air filter medium resistant not only to clogging with dust floating in air but also to clogging with oil mist.

Solution to Problem

That is, the present invention provides an air filter medium including a first porous PTFE membrane and a second porous PTFE membrane, wherein the air filter medium has a first main surface and a second main surface, the first porous PTFE membrane and the second porous PTFE membrane are arranged so that an air flow moving from the first main surface to the second main surface passes through the first porous PTFE membrane and subsequently through the second porous PTFE membrane, the first porous PTFE membrane includes a plurality of nodes and a plurality of fibrils, a proportion of areas occupied by the plurality of nodes on a surface of the first porous PTFE membrane is in the range of 1.5 to 3.0%, and an average of the areas of the plurality of nodes is 200 pmt or more.

Advantageous Effects of Invention

The present invention can provide an air filter medium resistant not only to clogging with dust floating in air but also to clogging with oil mist.

DESCRIPTION OF EMBODIMENTS

Hereinafter, embodiments of the present invention will be described with reference to FIGS. 1 to 6. The main surface of the air filter medium that is located on the upper side of each figure is defined as a first main surface 11, and the main surface opposite to the first main surface 11 is defined as a second main surface 12. In all of the figures, it is assumed that the upper side of the figure corresponds to the upstream side in the air flow direction when the air filter medium is placed in use. The "main surfaces" refer to the widest surfaces, namely the upper and lower surfaces, of the air filter medium.

Figure 1:
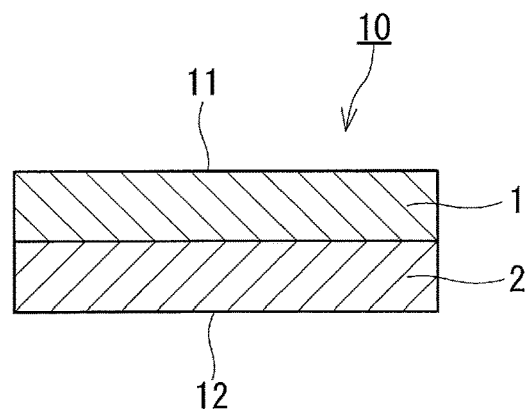
FIG. 1 is a schematic cross-sectional view showing an air filter medium as an embodiment of the present invention.

An air filter medium 10 shown in FIG. 1 includes a first porous PTFE membrane 1 and a second porous PTFE membrane 2. As shown in FIG. 1, the air filter medium 10 has a multilayer structure composed of the first porous PTFE membrane 1 and second porous PTFE membrane 2 which are arranged in this order from the upstream side in the air flow direction. A surface of the first porous PTFE membrane 1 forms the first main surface 11 of the air filter medium 10. A surface of the second porous PTFE membrane 2 forms the second main surface 12 of the air filter medium 10. The first porous PTFE membrane 1 is stacked directly on the second porous PTFE membrane 2.

Figure 2:
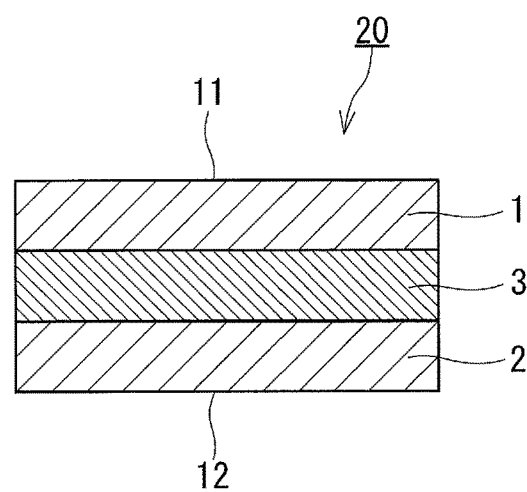
FIG. 2 is a schematic cross-sectional view showing an air filter medium as another embodiment of the present invention.
Figure 3:
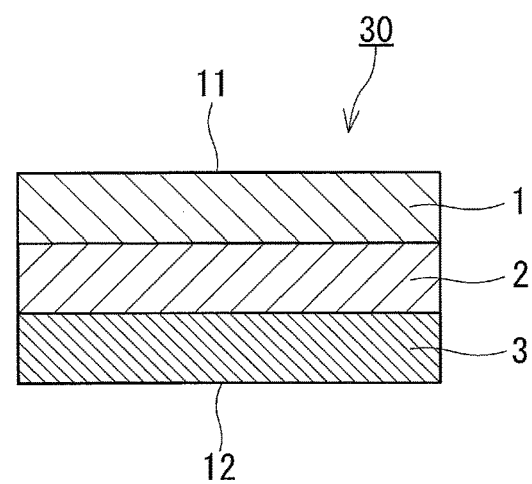
FIG. 3 is a schematic cross-sectional view showing an air filter medium as still another embodiment of the present invention.
Figure 4:
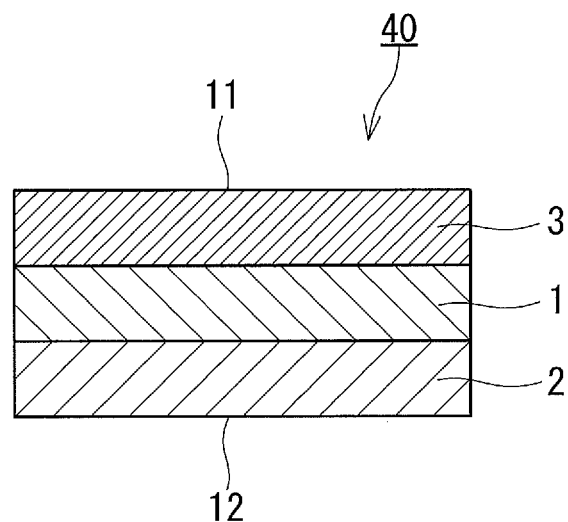
FIG. 4 is a schematic cross-sectional view showing an air filter medium as still another embodiment of the present invention.

Air filter media 20, 30, and 40 shown in FIGS. 2 to 4 include an air-permeable fiber layer 3 in addition to the first porous PTFE membrane 1 and the second porous PTFE membrane 2.

The air filter medium 20 shown in FIG. 2 has a multilayer structure composed of the first porous PTFE membrane 1, air-permeable fiber layer 3, and second porous PTFE membrane 2 which are arranged in this order from the upstream side in the air flow direction. A surface of the first porous PTFE membrane 1 forms the first main surface 11 of the air filter medium 20. A surface of the second porous PTFE membrane 2 forms the second main surface 12 of the air filter medium 20. The first porous PTFE membrane 1 is in contact with one surface of the air-permeable fiber layer 3, while the second porous PTFE membrane 2 is in contact with the other surface of the air-permeable fiber layer 3.

The air filter medium 30 shown in FIG. 3 has a multilayer structure composed of the first porous PTFE membrane 1, second porous PTFE membrane 2, and air-permeable fiber layer 3 which are arranged in this order from the upstream side in the air flow direction. A surface of the first porous PTFE membrane 1 forms the first main surface 11 of the air filter medium 30. A surface of the air-permeable fiber layer 3 forms the second main surface 12 of the air filter medium 30. The first porous PTFE membrane 1 is in contact with one surface of the second porous PTFE membrane 2, while the air-permeable fiber layer 3 is in contact with the other surface of the second porous PTFE membrane 2.

The air filter medium 40 shown in FIG. 4 has a multilayer structure composed of the air-permeable fiber layer 3, first porous PTFE membrane 1, and second porous PTFE membrane 2 which are arranged in this order from the upstream side in the air flow direction. A surface of the air-permeable fiber layer 3 forms the first main surface 11 of the air filter medium 40. A surface of the second porous PTFE membrane 2 forms the second main surface 12 of the air filter medium 40. The air-permeable fiber layer 3 is in contact with one surface of the first porous PTFE membrane 1, while the second porous PTFE membrane 2 is in contact with the other surface of the first porous PTFE membrane 1. When viewed from the first porous PTFE membrane 1, the air-permeable fiber layer 3 is disposed on a side opposite to a side where the second porous PTFE membrane 2 is disposed.

Figure 5:
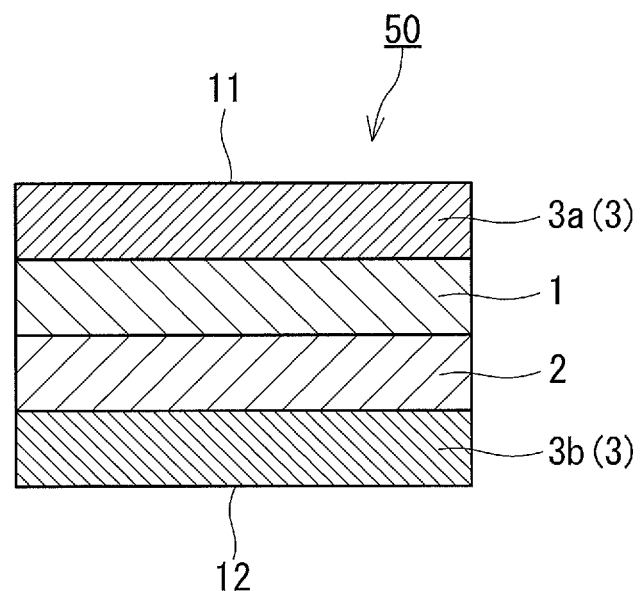
FIG. 5 is a schematic cross-sectional view showing an air filter medium as still another embodiment of the present invention.

An air filter medium 50 shown in FIG. 5 includes two air-permeable fiber layers 3 in addition to the first porous PTFE membrane 1 and the second porous PTFE membrane 2. The two air-permeable fiber layers 3 include a first air-permeable fiber layer 3a and a second air-permeable fiber layer 3b. The air filter medium 50 has a multilayer structure composed of the first air-permeable fiber layer 3a, first porous PTFE membrane 1, second porous PTFE membrane 2, and second air-permeable fiber layer 3b which are arranged in this order from the upstream side in the air flow direction. The first air-permeable fiber layer 3a forms the first main surface 11 of the air filter medium 50. The second air-permeable fiber layer 3b forms the second main surface 12 of the air filter medium 50. The first air-permeable fiber layer 3a is in contact with one surface of the first porous PTFE membrane 1, while the second porous PTFE membrane 2 is in contact with the other surface of the first porous PTFE membrane 1. The second air-permeable fiber layer 3b is in contact with one surface of the second porous PTFE membrane 2, while the first porous PTFE membrane 1 is in contact with the other surface of the second porous PTFE membrane 2. When viewed from the first porous PTFE membrane 1, the first air-permeable fiber layer 3a is disposed on a side opposite to a side where the second porous PTFE membrane 2 is disposed. When viewed from the second porous PTFE membrane 2, the second air-permeable fiber layer 3b is disposed on a side opposite to a side where the first porous PTFE membrane 1 is disposed.

Figure 6:
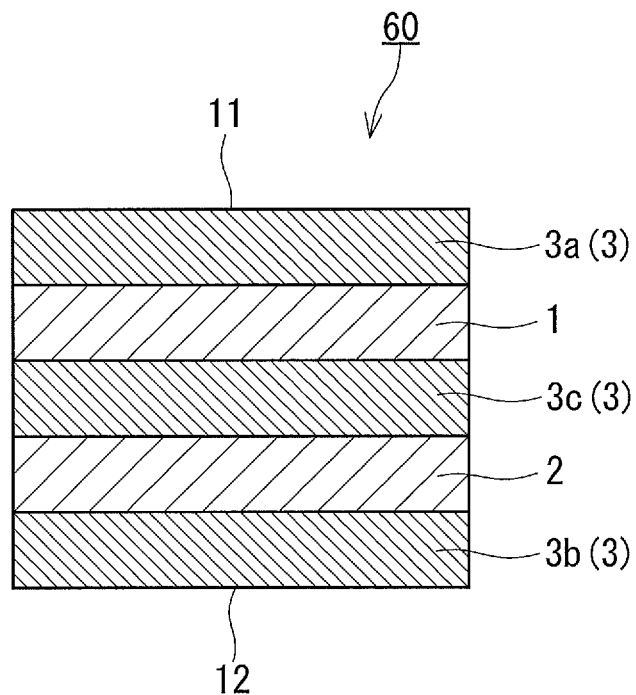
FIG. 6 is a schematic cross-sectional view showing an air filter medium as still another embodiment of the present invention.

An air filter medium 60 shown in FIG. 6 includes three air-permeable fiber layers 3 in addition to the first porous PTFE membrane 1 and the second porous PTFE membrane 2. The three air-permeable fiber layers 3 include a first air-permeable fiber layer 3a, a second air-permeable fiber layer 3b, and a third air-permeable fiber layer 3c. The air filter medium 60 has a multilayer structure composed of the first air-permeable fiber layer 3a, first porous PTFE membrane 1, third air-permeable fiber layer 3c, second porous PTFE membrane 2, and second air-permeable fiber layer 3b which are arranged in this order from the upstream side in the air flow direction. The first air-permeable fiber layer 3a forms the first main surface 11 of the air filter medium 60. The second air-permeable fiber layer 3b forms the second main surface 12 of the air filter medium 60. The first air-permeable fiber layer 3a is in contact with one surface of the first porous PTFE membrane 1, while the third air-permeable fiber layer 3c is in contact with the other surface of the first porous PTFE membrane 1. The second air-permeable fiber layer 3b is in contact with one surface of the second porous PTFE membrane 2, while the third air-permeable fiber layer 3c is in contact with the other surface of the second porous PTFE membrane 2. When viewed from the first porous PTFE membrane 1, the first air-permeable fiber layer 3a is disposed on a side opposite to a side where the second porous PTFE membrane 2 is disposed. When viewed from the second porous PTFE membrane 2, the second air-permeable fiber layer 3b is disposed on a side opposite to a side where the first porous PTFE membrane 1 is disposed.

In the air filter media 10, 20, 30, 40, 50, and 60 shown in FIGS. 1 to 6, as seen from the foregoing, the first porous PTFE membrane 1 and the second porous PTFE membrane 2 are arranged so that an air flow moving from the first main surface 11 to the second main surface 12 passes through the first porous PTFE membrane 1 and subsequently through the second porous PTFE membrane 2. The air filter medium according to the present invention is not limited to the configurations shown in FIGS. 1 to 6 and may further include an additional layer. Examples of the additional layer include a glass filter medium, a melt-blown non-woven fabric, and a nanofiber layer which may be disposed upstream of the first porous PTFE membrane 1.

Hereinafter, the layers constituting the air filter media 10, 20, 30, 40, 50, and 60 will be described.

<First Porous PTFE Membrane 1>

The first porous PTFE membrane 1 has moderate air permeability, and collects relatively large-diameter particles of oil mist in advance to prevent the second porous PTFE membrane 2 from being clogged with oil mist. The presence of the first porous PTFE membrane 1 reduces a pressure drop increase resulting from the use of the air filter media 10, 20, 30, 40, 50, and 60, thus increasing the service life of the air filter media 10, 20, 30, 40, 50, and 60.

A stretched porous PTFE membrane includes a plurality of nodes and a plurality of fibrils. The node is a non-fibrous part consisting of an aggregate (a secondary particle or once-molten secondary particle) of PTEF particles used as a raw material. The fibril is a fine, fibrous part connecting one node to another. The porous PTFE membrane has a network structure composed of the plurality of nodes and the plurality of fibrils.

When the proportion of the areas occupied by the nodes on the surface of the porous PTFE membrane is large, relatively small particles of dust and oil mist pass through the porous PTFE membrane and relatively large particles of dust and oil mist are collected by the porous PTFE membrane. On the other hand, when the proportion of the areas occupied by the nodes on the surface of the porous PTFE membrane is small, relatively large particles of dust and oil mist are collected by the porous PTFE membrane, as well as relatively small particles of dust and oil mist.

In the present embodiment, the first porous PTFE membrane 1 includes a plurality of nodes and a plurality of fibrils. The proportion (hereinafter may be referred to as "node proportion") of the areas occupied by the plurality of nodes on the surface of the first porous PTFE membrane 1 is in the range of 1.5 to 3.0%. With such a structural feature, the first porous PTFE membrane 1 mainly collects large particles of dust and oil mist. This prevents the second porous PTFE membrane 2 from being clogged with oil mist. That is, the first porous PTFE membrane 1 can collect and retain more oil while an increase in pressure drop is reduced. The amount of retained oil can be increased while pressure drop across the air filter medium is reduced.

An adequately large proportion of the areas occupied by the nodes on the surface of the first porous PTFE membrane 1 leads to reduction in a pressure drop increase resulting from lamination of the air-permeable fiber layer 3 such as a non-woven fabric on the first porous PTFE membrane 1 and a pressure drop increase resulting from lamination of the first porous PTFE membrane 1 on the second porous PTFE membrane 2. That is, according to the present embodiment, the amount of retained oil can be increased while a pressure drop increase resulting from lamination is reduced.

If the proportion of the areas occupied by the nodes is too small, small particles of dust and oil mist also are collected by the first porous PTFE membrane. This makes it difficult to increase the amount of retained oil along with reduction in an increase in pressure drop across the air filter medium.

If the proportion of the areas occupied by the nodes is too large, the pressure drop increases too much.

In the present embodiment, the average of the areas of the plurality of nodes present on the surface of the first porous PTFE membrane 1 is 200 $\mu m^2$ or more. That is, the node proportion of 1.5 to 3.0% are achieved by relatively large nodes. A structure of a porous PTFE membrane in which the above node proportion is achieved by large nodes is different from a structure of a porous PTFE membrane in which the above node proportion is achieved by small nodes. It is the former structure that is suitable for collecting large particles of dust and oil mist. The upper limit of the average of the areas of the nodes is not particularly defined and is, for example, 400 $\mu m^2$.

The proportion of the areas of the plurality of nodes on the surface of the first porous PTFE membrane 1 can be determined by the method described hereinafter. First, the surface of the first porous PTFE membrane 1 is observed with an electron microscope (scanning electron microscope). Next, nodes on the resulting image (or in a portion thereof) are identified. The sum S1 of the areas occupied by the nodes is divided by the area S2 of the image (or a portion thereof). The proportion of the areas occupied by the nodes can thus be obtained. To identify the nodes and determine the proportion of the areas occupied by the nodes, image processing can be employed. To determine the proportion of the areas occupied by the nodes, the image used should have an adequate size which can be considered to allow observation of the entire surface of the first porous PTFE membrane 1. The proportion of the areas occupied by the nodes can be determined using, for example, an image including at least 20 nodes.

The average of the areas of the nodes can be obtained by dividing the total S1 of the areas occupied by the nodes on the image by the number of the nodes. The average of the areas of the nodes can also be determined using a sufficient number of nodes (for example, 20 nodes).

As described with reference to FIGS. 4 to 6, the air-permeable fiber layer 3 may be in contact with the surface of the first porous PTFE membrane 1. In this case, the air-permeable fiber layer 3 can be peeled from the first porous PTFE membrane 1 to observe the surface of the first porous PTFE membrane 1 with an electron microscope. When the air-permeable fiber layer 3 is, for example, a non-woven fabric which has a coarse texture, the surface of the first porous PTFE membrane 1 can be exposed through the interstices between the fibers of the non-woven fabric to observe the surface with an electron microscope.

Measurement of the other properties of the first porous PTFE membrane 1 is also made possible by peeling the air-permeable fiber layer 3 from the first porous PTFE membrane 1. The same applies to the second porous PTFE membrane 2.

Other structural features of the first porous PTFE membrane 1 will be described.

It is preferable that the average pore diameter of the first porous PTFE membrane 1 be larger than the average pore diameter of the second porous PTFE membrane 2, because in this case the effect on the resistance to clogging with oil mist is further enhanced. When the average pore diameter of the first porous PTFE membrane 1 disposed on the upstream side in the air flow direction is larger than the average pore diameter of the second porous PTFE membrane 2, the first porous PTFE membrane 1 collects relatively large particles of oil mist in advance on the upstream side in the air flow direction while the second porous PTFE membrane 2 collects smaller particles of oil mist on the downstream side in the air flow direction. Thus, since both the first porous PTFE membrane 1 and second porous PTFE membrane 2 can collect oil mist, clogging of the air filter medium can be further reduced.

The average pore diameter of the first porous PTFE membrane 1 is, for example, 3 to 30 μm, preferably 4 to 21 μm, and more preferably 4 to 10 μm. The average pore diameters of the first porous PTFE membrane 1 and the second porous PTFE membrane 2 described later can be determined by measuring the pore diameter of each porous PTFE membrane at three or more points with "Perm Porometer" manufactured by Porous Materials Inc. and calculating the average of the measured values.

It is preferable that the thickness of the first porous PTFE membrane 1 be larger than the thickness of the second porous PTFE membrane 2, because in this case the effect on the resistance to clogging with oil mist is further enhanced. When the thickness of the first porous PTFE membrane 1 is larger than the thickness of the second porous PTFE membrane 2, the first porous PTFE membrane 1 collects relatively large particles of oil mist in advance on the upstream side in the air flow direction while the second porous PTFE membrane 2 collects smaller particles of oil mist on the downstream side in the air flow direction. Thus, since both the first porous PTFE membrane 1 and second porous PTFE membrane 2 can collect oil mist, clogging of the air filter medium can be further reduced.

The thickness of the first porous PTFE membrane 1 is, for example, 7 to 36 μm and preferably 12 to 24 μm. The value of the thickness is an average of thickness values measured at any number of points (five points, for example) using a digital thickness gauge.

It is preferable that the porosity of the first porous PTFE membrane 1 be higher than the porosity of the second porous PTFE membrane 2, because in this case the effect on the resistance to clogging with oil mist is further enhanced. When the porosity of the first porous PTFE membrane 1 is higher than the porosity of the second porous PTFE membrane 2, the first porous PTFE membrane 1 collects relatively large particles of oil mist in advance on the upstream side in the air flow direction while the second porous PTFE membrane 2 collects smaller particles of oil mist on the downstream side in the air flow direction. Thus, since both the first porous PTFE membrane 1 and second porous PTFE membrane 2 can collect oil mist, clogging of the air filter medium can be further reduced.

The porosity of the first porous PTFE membrane 1 is, for example, 90 to 99%. The porosity can be measured by the following method. First, the membrane to be measured is cut into a piece of given shape (the shape of a 6-cm-diameter circle, for example), and its volume and weight are determined. The results are substituted into the following expression to calculate the porosity.

$$\text{Porosity (\%)} = 100 \times (V - (W/D))/V$$

V: Volume (cm³)
W: Weight (g)
D: Density of PTFE (g/cm³)

The pressure drop across the first porous PTFE membrane 1 is, for example, 10 to 45 Pa and preferably 15 to 40 Pa. The pressure drop across the first porous PTFE membrane 1, the pressure drop across the second porous PTFE membrane 2 described later, and the pressure drop across the air filter medium can be measured by the following method. The first porous PTFE membrane 1, second porous PTFE membrane 2, or air filter medium is set in a circular holder with an effective area of 100 cm², and air is passed through the first porous PTFE membrane 1, second porous PTFE membrane 2, or air filter medium set in the holder. The linear flow velocity of the air passing through the first porous PTFE membrane 1, second porous PTFE membrane 2, or air filter medium is adjusted to 5.3 cm/sec with the aid of a flowmeter, and then the pressure drop is measured with a pressure meter (manometer). The pressure drop is measured eight times for the first porous PTFE membrane 1, second porous PTFE membrane 2, or air filter medium, and the average of the eight values is calculated.

<Second Porous PTFE Membrane 2>

The second porous PTFE membrane 2 collects small particles of oil mist that cannot be collected by the first porous PTFE membrane 1, and thus increases the amount of oil mist collected by the air filter media 10, 20, 30, 40, 50, and 60.

As is the case for the first porous PTFE membrane 1, the second porous PTFE membrane 2 includes a plurality of nodes and a plurality of fibrils. The proportion of the areas of the plurality of nodes on the surface of the second porous PTFE membrane 2 is smaller than the proportion of the areas of the plurality of nodes on the surface of the first porous PTFE membrane 1. Specifically, the proportion of the areas occupied by the plurality of nodes on the surface of the second porous PTFE membrane 2 is in the range of 0.7 to 1.0%. When the second porous PTFE membrane 2 satisfies this condition, smaller-diameter particles of dust and oil mist can be collected by the second porous PTFE membrane 2, and thus the collection efficiency of the air filter medium improves.

The average of the areas of the plurality of nodes of the second porous PTFE membrane 2 is in the range of 3.0 to 20 μm². When the second porous PTFE membrane 2 satisfies this condition, further improvement of the collection efficiency of the air filter medium can be expected.

The proportion of the areas occupied by the plurality of nodes on the surface of the second porous PTFE membrane 2 and the average of the areas of the plurality of nodes of the second porous PTFE membrane 2 can be determined in the same manner as for the first porous PTFE membrane 1. However, the nodes of the second porous PTFE membrane 2 are small. Therefore, the magnification of an electron microscope with which an image of the first porous PTFE membrane 1 is obtained may be different from the magnification of an electron microscope with which an image of the second porous PTFE membrane 2 is obtained.

The average pore diameter of the second porous PTFE membrane 2 is, for example, 0.1 to 3 μm, preferably 0.2 to 3 μm, and more preferably 0.6 to 1.5 μm.

The thickness of the second porous PTFE membrane 2 is, for example, 1 μm or more and less than 7 μm and preferably 1 to 5 μm. The ratio of the thickness of the first porous PTFE membrane 1 to the thickness of the second porous PTFE membrane 2 is desirably more than 1.

The porosity of the second porous PTFE membrane 2 is, for example, 50% or more and less than 90%.

The pressure drop across the second porous PTFE membrane 2 is, for example, 50 to 300 Pa, preferably 60 to 140 Pa, and more preferably 80 to 120 Pa.

Exemplary methods for producing the first porous PTFE membrane 1 and second porous PTFE membrane 2 will be described hereinafter.

First, a liquid lubricant is added and mixed with an unsintered PTFE fine powder. The PTFE fine powder used is not particularly limited and can be a commercially-available product. The liquid lubricant used is not particularly limited, as long as the liquid lubricant can wet the surface of the PTFE fine powder and can be removed later. Examples of liquid lubricants that can be used include: hydrocarbon oils such as naphtha, white oil, liquid paraffin, toluene, and xylene; alcohols; ketones; and esters. Two or more liquid lubricants may be used in combination.

The proportion of the liquid lubricant added to the PTFE fine powder is chosen as appropriate depending, for example, on the type of the PTFE fine powder, the type of the lubricant oil, and the conditions of sheet forming described later. For example, the amount of the liquid lubricant is 15 to 35 parts by weight with respect to 100 parts by weight of the PTFE fine powder.

Next, the mixture of the unsintered PTFE fine powder and the liquid lubricant is formed into a sheet shape without sintering, and thus a sheet-shaped body of PTFE is obtained. Examples of the method for sheet forming include: a rolling method in which the mixture is extruded into a rod shape and then the rod-shaped body is flattened with a pair of rolls; and an extrusion method in which the mixture is extruded into a plate shape to obtain a sheet-shaped body. The sheet-shaped body made by such a method is in the form of a strip. Two or more methods may be combined to accomplish the sheet forming. The thickness of the sheet-shaped body of PTFE is chosen as appropriate depending, for example, on the conditions of the subsequent stretching and is, for example, 0.1 to 0.5 mm.

The liquid lubricant contained in the sheet-shaped body of PTFE is preferably removed by a method such as heating or extraction before the stretching step subsequently performed. Examples of the solvent used for extraction include, but are not particularly limited to, normal-decane, dodecane, naphtha, kerosene, and liquid paraffin.

Next, the sheet-shaped body of PTFE is stretched. The stretching method is preferably biaxial stretching. When the first porous PTFE membrane 1 and the second porous PTFE membrane 2 are produced by stretching sheet-shaped bodies of PTFE, the conditions such as the stretching temperature and stretching ratio should be adjusted to allow the proportion of the areas occupied by the nodes and the average of the areas of the nodes to fall within the desired ranges. Not only the stretching temperature and stretching ratio but also, for example, the amount of the liquid lubricant and the formation method for the mixture affect the proportion of the areas occupied by the nodes and the average of the areas of the nodes.

When the first porous PTFE membrane 1 is produced, the sheet-shaped body of PTFE is stretched while being heated at a temperature equal to or higher than the melting point of PTFE. The sheet-shaped body of PTFE is stretched in the longitudinal direction (machine direction (MD)), for example, at 370 to 380° C. The stretching ratio in the longitudinal direction can be set so that the length after stretching is, for example, 50 to 200 times, preferably 80 to 150 times, and more preferably 90 to 100 times the length before stretching. Next, the sheet-shaped body of PTFE is stretched in the width direction (transverse direction (TD)), for example, at 130 to 400° C. The stretching ratio in the width direction can be set so that the width after stretching is 5 to 8 times the width before stretching. The stretching in the longitudinal direction at a temperature equal to or higher than the melting point (327° C.) of PTFE results in an increase in the proportion of the areas occupied by the nodes and tends to result in an increase in the area of each node than stretching at a temperature lower than the melting point of PTFE.

When the second porous PTFE membrane 2 is produced, the sheet-shaped body of PTFE is stretched while being heated at a temperature lower than the melting point of PTFE. The sheet-shaped body of PTFE is stretched in the longitudinal direction, for example, at 270 to 290° C. The stretching ratio in the longitudinal direction can be set so that the length after stretching is 15 to 40 times the length before stretching. Next, the sheet-shaped body of PTFE is stretched in the width direction, for example, at 120 to 130° C. The stretching ratio in the width direction can be set so that the width after stretching is 15 to 40 times the width before stretching.

The first porous PTFE membrane 1 and the second porous PTFE membrane 2 are produced by the above methods, and these membranes are bonded together directly or with the air-permeable fiber layer 3 interposed therebetween. If necessary, the first air-permeable fiber layer 3a is bonded to the first porous PTFE membrane 1, and the second air-permeable fiber layer 3b is bonded to the second porous PTFE membrane 2. In this way, the air filter media described with reference to FIGS. 1 to 6 are obtained.

PTFE is generally in a sintered state, unsintered state, or intermediate state (hereinafter may be referred to as "half-sintered state") depending on the condition of crystal transformation. When PTFE is completely sintered, one endothermic peak is observed around 325° C. in differential scanning calorimetry (DSC). When PTFE is completely unsintered, one endothermic peak is observed typically around 336° C. in DSC. Depending on thermal history, however, there may be two separate peaks around 325° C. and 336° C. even when PTFE is in the unsintered state.

An apparent or potential endothermic peak observed in DSC typically around 336° C. (330 to 340° C.) can confirm that PTFE particles remain partially unsintered. In the completely sintered state, an endothermic peak exists only around 325° C. and even a potential peak cannot be observed around 336° C. As shown above, the sintering state of PTFE can be easily examined by means of DSC.

<Air-Permeable Fiber Layer 3>

As shown in FIGS. 2 to 6, the air filter medium of the present embodiment may include the air-permeable fiber layer 3. A material having sufficient air permeability is used as the air-permeable fiber layer 3. A material constituted by fibers such as short fibers and filaments and having higher air permeability than the first porous PTFE membrane 1 and second porous PTFE membrane 2 can be used as the air-permeable fiber layer 3, and examples of such a material include non-woven fabrics, woven fabrics, meshes (reticulated sheets), and other porous materials. Among these, non-woven fabrics are preferred because they are superior in terms of strength, flexibility, and workability.

The average fiber diameter of the fibers constituting the air-permeable fiber layer 3 is, for example, 10 to 30 µm and preferably 15 to 25 µm.

The mass per unit area of the air-permeable fiber layer 3 is, for example, 15 to 300 g/m$^2$ and preferably 15 to 100 g/m$^2$ in view of the air permeability of the air filter media 20, 30, 40, 50, and 60 and the ease of handling of the air filter media 20, 30, 40, 50, and 60 in pleating. The thickness of the air-permeable fiber layer 3 is preferably 130 to 200 µm in view of the air permeability of the air filter media 20, 30, 40, 50, and 60, the ease of handling of the air filter media 20, 30, 40, 50, and 60 in pleating, and the overall thickness of the air filter media 20, 30, 40, 50, and 60.

The air filter media 40, 50, and 60 described with reference to FIGS. 4 to 6 have the air-permeable fiber layer 3 (first air-permeable fiber layer 3a) disposed upstream of the first porous PTFE membrane 1. When the mass per unit area of this air-permeable fiber layer 3 is large, oil mist is likely to be collected by the air-permeable fiber layer 3. Accordingly, the mass per unit area of the air-permeable fiber layer 3 disposed upstream of the first porous PTFE membrane 1 is, for example, 30 to 260 g/m$^2$ and preferably 30 to 200 g/m$^2$. In the air filter media 50 and 60 described with reference to FIGS. 5 and 6, the mass per unit area of the air-permeable fiber layers 3 (second air-permeable fiber layer 3b and third air-permeable fiber layer 3c) disposed downstream of the first porous PTFE membrane 1 can be determined in view of reducing the increase in pressure drop. The mass per unit area of the air-permeable fiber layers 3 disposed downstream of the first porous PTFE membrane 1 is, for example, equal to or smaller than the mass per unit area of the air-permeable fiber layer 3 disposed upstream of the first porous PTFE membrane 1. The mass per unit area of the air-permeable fiber layers 3 disposed downstream of the first porous PTFE membrane 1 is, for example, 15 to 100 g/m$^2$ and preferably 15 to 30 g/m$^2$. All of the air-permeable fiber layers 3 of the air filter medium 50 (or 60) may have the same structure and properties.

Examples of the material of the fibers constituting the air-permeable fiber layer 3 include, but are not particularly limited to: polyolefins such as polyethylene (PE) and polypropylene (PP); polyesters such as polyethylene terephthalate (PET); polyamides; and composites thereof. The fibers constituting the air-permeable fiber layer 3 preferably contain a polyolefin with a low melting point, in particular polyethylene, in view of easy and reliable bonding between the first porous PTFE membrane 1 or second porous PTFE membrane 2 and the air-permeable fiber layer 3.

The air-permeable fiber layer 3 is preferably constituted by composite fibers having a core-sheath structure in which the core component has a higher melting point than the sheath component. A material with a relatively high melting point, such as PET, is used as the core component, and a material with a relatively low melting point, such as polyethylene, is used as the sheath component. Specific examples of the fibers having a core-sheath structure include: fibers having a core portion made of PET and a sheath portion made of PE (PET/PE fibers); and fibers having a core portion made of PP and a sheath portion made of PE (PP/PE fibers). The use of the air-permeable fiber layer 3 constituted by fibers having a core-sheath structure reduces heat-induced change in the structure and thickness of the air-permeable fiber layer 3 when the air-permeable fiber layer 3 is laminated to the first porous PTFE membrane 1 or second porous PTFE membrane 2 by heating. Additionally, the first porous PTFE membrane 1 and second porous PTFE membrane 2 can be prevented from being damaged due to shrinkage of the air-permeable fiber layer 3. In view of easy and reliable bonding between the first porous PTFE membrane 1 or second porous PTFE membrane 2 and the air-permeable fiber layer 3, the air-permeable fiber layer 3 is preferably constituted by PET/PE fibers.

Examples of the method for joining the first porous PTFE membrane 1, second porous PTFE membrane 2, and air-permeable fiber layer 3 together include heat-assisted nip lamination and lamination using an infrared heater (see JP 2003-190749 A). Of these, the lamination using an infrared heater is preferred because this lamination can achieve strong bonding without decreasing the thickness of each layer. When the air-permeable fiber layer 3 is constituted by fibers having a core-sheath structure, it is preferable that the temperature of heating of the air-permeable fiber layer 3 be set equal to or higher than the softening point (preferably equal to or higher than the melting point) of the sheath component and lower than the melting point of the core component.

The order of stacking of the first porous PTFE membrane 1, second porous PTFE membrane 2, and air-permeable fiber layer 3 is not limited, as long as the first porous PTFE membrane and the second porous PTFE membrane are arranged so that an air flow moving from the first main surface 11 to the second main surface 12 passes through the first porous PTFE membrane and subsequently through the second porous PTFE membrane. There may be a portion where a plurality of the first porous PTFE membranes 1 are contiguously stacked, there may be a portion where a plurality of the second porous PTFE membranes 2 are contiguously stacked, and there may be a portion where a plurality of the air-permeable fiber layers 3 are contiguously stacked. The air-permeable fiber layers 3 may be the same or different from each other.

The pressure drop across the air filter medium is, for example, 60 to 350 Pa, preferably 80 to 270 Pa, and more preferably 100 to 200 Pa.

The air filter medium of the present embodiment has excellent resistance to clogging with oil mist. When poly-α-olefin (hereinafter referred to as "PAO") in the form of polydisperse particles with an average particle diameter of 0.15 μm is passed through the air filter medium at a concentration of 20 to 40 g/m$^3$ and a linear flow velocity of 5.3 cm/sec to measure the change in pressure drop, the amount of PAO collected by the air filter medium is, for example, 20 mg/m$^2$/Pa or more, preferably 70 mg/m$^2$/Pa or more, more preferably 90 mg/m$^2$/Pa or more, and particularly preferably 100 mg/m$^2$/Pa or more, at a time point where the pressure drop reaches 500 Pa. The upper limit of the amount of collected PAO is not particularly defined and is, for example, 200 mg/m$^2$/Pa. The amount of collected PAO (mg/m$^2$/Pa) is determined by dividing an increase in weight of the air filter medium (the weight of PAO) (mg) by the area (m$^2$) of the air filter medium and by further dividing the resulting value by an increase in pressure drop (500−(pressure drop at the start of measurement)) (Pa). For example, "Durasyn 164" manufactured by INEOS can be used as the PAO. The polydisperse PAO with an average particle diameter of 0.15 μm can be generated, for example, using a constant-output aerosol atomizer ("TSI No. 3076" manufactured by TOKYO DYLEC CORP.).

The air filter medium of the present embodiment further has excellent resistance to clogging with dust. When NaCl in the form of polydisperse particles with an average particle diameter of 0.5 μm is passed through the air filter medium at a concentration of 1 to 3 g/m$^3$ and a linear flow velocity of 5.3 cm/sec to measure the change in pressure drop, the amount of NaCl collected by the air filter medium is, for example, 8 mg/m$^2$/Pa or more, preferably 9 mg$^2$/m$^2$/Pa or more, more preferably 12 mg/m$^2$/Pa or more, and particularly preferably 17 mg/m$^2$/Pa or more, at a time point where the pressure drop reaches 500 Pa. The upper limit of the amount of collected NaCl is not particularly defined and is, for example, 20 mg/m$^2$/Pa. The amount of collected NaCl (mg/m$^2$/Pa) is determined by dividing an increase in weight of the air filter medium (the weight of NaCl) (mg) by the area (m$^2$) of the air filter medium and by further dividing the resulting value by an increase in pressure drop (500−(pressure drop at the start of measurement)) (Pa). The polydisperse NaCl with an average particle diameter of 0.5 μm can be generated, for example, using a constant-output aerosol atomizer ("TSI No. 3076" manufactured by TOKYO DYLEC CORP.).

The collection efficiency of the air filter medium of the present embodiment, as measured using bis(2-ethylhexyl) phthalate with an average particle diameter of 0.1 to 0.2 μm at a permeation rate of 5.3 cm/sec, is, for example, 98 to 99.999995%, preferably 99.5 to 99.99999%, and more preferably 99.95 to 99.99995%. The air filter medium of the present embodiment may be an air filter medium complying with HEPA grade (high-efficiency particulate air grade) specified in Japanese Industrial Standard (JIS) Z 8122 (2000) or may be an air filter medium complying with ULPA grade (ultra-low penetration air grade) specified in the same standard.

The air filter medium of the present embodiment may be pleated by a known technique. The pleating is accomplished, for example, by using a reciprocating machine to fold the filter medium along mountain and valley folds arranged alternately in parallel on the surface of the filter medium and thereby form the medium into a series of W-shapes. The pleated air filter medium may be called an air filter pack. The air filter pack may be provided with a spacer to maintain the pleated shape. A string of resin, called a bead, is often used as the spacer. The bead is disposed on the filter medium to extend in a direction perpendicular to the mountain (valley) folds (in such a direction as to traverse the mountains and valleys). Preferably, a plurality of such beads are disposed on the filter medium to extend in this direction with predetermined intervals therebetween. The beads are disposed, for example, on both of the front and back sides of the filter medium. The beads are typically formed by melting a resin such as polyamide and polyolefin and applying the molten resin.

Figure 7A:
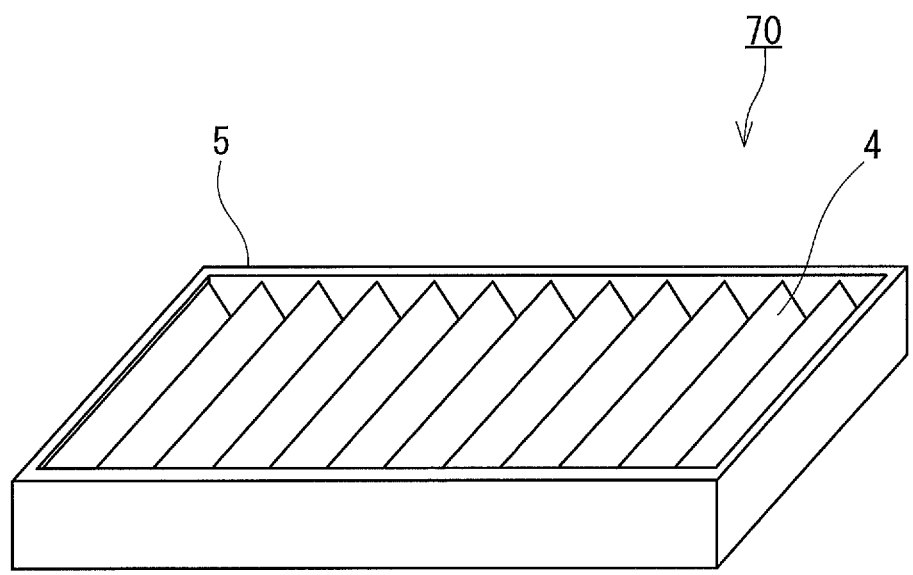
FIG. 7A is a perspective view showing an air filter unit as an embodiment of the present invention.

If necessary, the pleated air filter medium (air filter pack 4) is processed into an air filter unit 70 shown in FIG. 7A by supporting the peripheral portion of the air filter pack 4 with a frame (support frame). Depending, for example, on the intended use of the air filter, a member made of metal or resin may be used as a frame 5 surrounding the periphery of the air filter pack. When a frame made of resin is used, the pleated air filter medium may be fixed to the frame simultaneously with formation of the frame by injection molding.

Figure 7B:
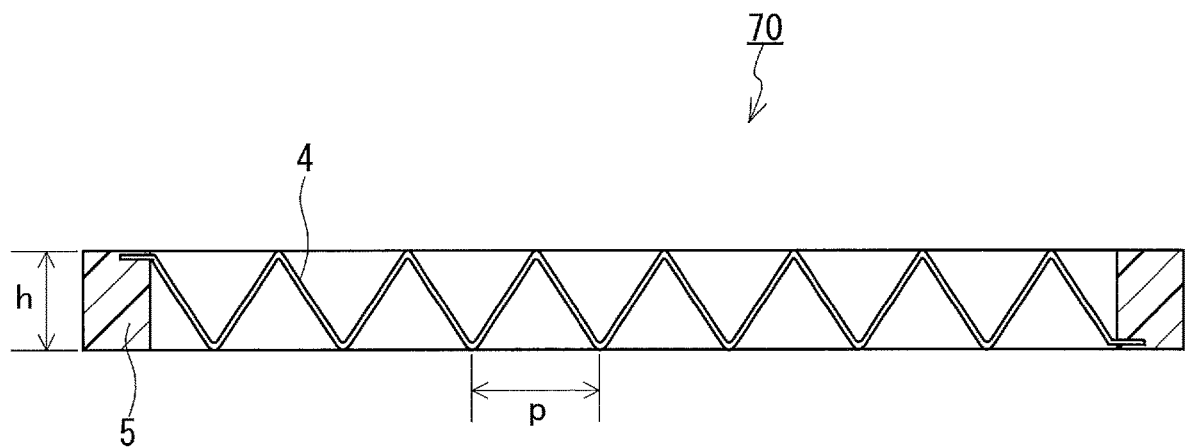
FIG. 7B is a cross-sectional view of the air filter unit shown in FIG. 7A.

As shown in FIG. 7B, a pleat distance P (distance between peaks of adjacent mountains) of the pleated air filter medium 4 is adjusted to a width which allows the air filter medium 4 to have a sufficient surface area. The pleat distance P is adjusted to the range of, for example, 2.54 to 12.7 mm and preferably 3.18 to 6.35 mm. For the same reason, a pleat height h of the air filter medium 4 is adjusted to the range of, for example, 5 to 300 mm and preferably 20 to 250 mm. The value of (pleat distance P)/(pleat height h) is, for example, 0.25 or less and preferably 0.22 or less.

The frame 5 may be made of a metallic material such as aluminum, stainless steel, a plated steel sheet, and coated steel sheet, or may be made of a resin material such as polyolefin, polyamide (including aromatic polyamide), polyurethane, polyester, polystyrene (such as ABS), and polycarbonate. The frame 5 may alternatively be made of a wood material such as a fire-retardant plywood sheet and a plywood sheet.

As described with reference to FIGS. 1 to 6, the air filter medium of the present embodiment has front and back sides distinguished from each other. If the second porous PTFE membrane 2 is disposed on the upstream side in the air flow direction while the first porous PTFE membrane 1 is disposed on the downstream side in the air flow direction, sufficient effect on the resistance to clogging with oil mist cannot be achieved. The front and back sides can be mistakenly switched, for example, when the air filter medium is subjected to a process such as rewinding in slitting (the process of adjusting the dimensions of the air filter medium by cutting) and pleating. To solve this problem, the configurations described hereinafter can be employed.

In the air filter media 50 and 60 described with reference to FIGS. 5 and 6, the first air-permeable fiber layer 3a and the second air-permeable fiber layer 3b may be each an embossed non-woven fabric; in this case, for example, the embossing pattern of the first air-permeable fiber layer 3a is different from the embossing pattern of the second air-permeable fiber layer 3b. With such a configuration, the first main surface 11 and the second main surface 12 can be distinguished to prevent the front and back sides from being mistakenly switched. The term "embossed non-woven fabric" refers to a non-woven fabric subjected to embossing. Specifically, an embossed non-woven fabric is a non-woven fabric having one or more recessed portions and one or more projecting portions. The embossed non-woven fabric has higher stiffness and higher strength than an unembossed non-woven fabric as thick as the embossed non-woven fabric. The embossed non-woven fabric has an indented pattern or, in other words, the embossed non-woven fabric has a sea-island structure when viewed in plan.

Figure 8A:
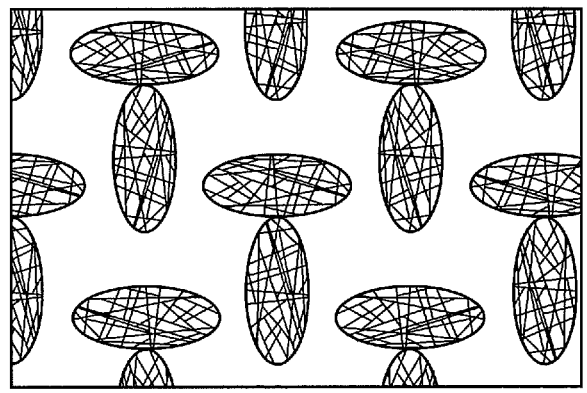
FIG. 8A is a plan view of a T-type embossed non-woven fabric.
Figure 8B:
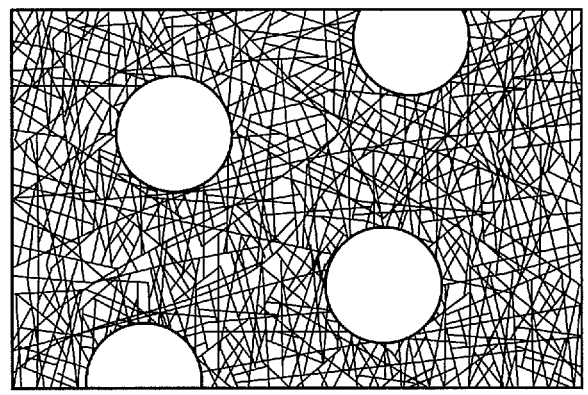
FIG. 8B is a plan view of an S-type embossed non-woven fabric.

Examples of embossed non-woven fabrics having different embossing patterns include a T-type embossed non-woven fabric shown in FIG. 8A and an S-type embossed non-woven fabric shown in FIG. 8B. In the T-type embossed non-woven fabric, as shown in FIG. 8A, elliptical portions corresponding to "islands" (where the fibers are not melted) are projecting portions, and a portion corresponding to the sea (where the fibers are melted) is a recessed portion. The T-type embossed non-woven fabric typically has a single, continuous recessed portion and a plurality of projecting portions. The T-type embossed non-woven fabric may have a plurality of recessed portions separate from each other. In the S-type embossed non-woven fabric, as shown in FIG. 8B, circular portions corresponding to "islands" (where the fibers are melted) are recessed portions, and a portion corresponding to the "sea" (where the fibers are not melted) is a projecting portion. The S-type embossed non-woven fabric typically has a plurality of recessed portions and a single, continuous projecting portion. The S-type embossed non-woven fabric may have a plurality of projecting portions separate from each other. With the use of these embossed non-woven fabrics, it is easier to achieve high air permeability and high bond strength.

Even if embossed non-woven fabrics of the same type are used, the first main surface 11 and the second main surface 12 can be distinguished when the embossed area ratio in the embossed non-woven fabric used as the first air-permeable fiber layer 3a is sufficiently different from the embossed area ratio in the embossed non-woven fabric used as the second air-permeable fiber layer 3b. The term "embossed area ratio" as used to describe an embossed non-woven fabric refers to the ratio of the area of a recessed portion (portion where fibers are melted) or the total area of a plurality of recessed portions to the area of the embossed non-woven fabric. The embossed area ratio can be calculated by the following method. The surface of the non-woven fabric is observed with a microscope such as an electron microscope at a given magnification (for example, a magnification of 25 times). On the basis of the obtained image, the proportion of the embossed portion(s) (recessed portion(s)) is calculated. In the case of an S-type non-woven fabric (see FIG. 8B), the recessed portions are assumed to be circular. In the case of a T-type non-woven fabric (see FIG. 8A), the projecting portions (unembossed portions) are assumed to be elliptical.

The calculation of the embossed area ratio should be carried out using an image of an adequate size.

Embossed non-woven fabrics include a double-embossed non-woven fabric having two embossed surfaces and a single-embossed non-woven fabric having only one embossed surface. A double-embossed non-woven fabric may be used as one of the first air-permeable fiber layer 3a and the second air-permeable fiber layer 3b while a single-embossed non-woven fabric is used as the other. An embossed non-woven fabric may be used as one of the first air-permeable fiber layer 3a and the second air-permeable fiber layer 3b while an unembossed non-woven fabric is used as the other. These configurations also allow distinguishing between the first main surface 11 and the second main surface 12.

In another exemplary configuration, at least one selected from the first main surface 11 and the second main surface 12 is provided with an identification mark that allows distinguishing between the first main surface 11 and the second main surface 12. This configuration is advantageous because it is applicable to all of the air filter media described with reference to FIGS. 1 to 6.

The type of the identification mark that allows distinguishing between the first main surface 11 and the second main surface 12 is not particularly limited. The identification mark includes at least one selected from the group consisting of a letter, a figure, and a symbol. Examples of the method for providing the identification mark include: applying an ink to at least one selected from the first main surface 11 and the second main surface 12; and forming asperities on at least one selected from the first main surface 11 and the second main surface 12. These methods make it possible to distinguish between the first main surface 11 and the second main surface 12. The asperities can be formed, for example, by pressing a portion of the air filter medium, by melting a portion of the air filter medium, or by punching a portion of the member (for example, the first air-permeable fiber layer 3a) forming the first main surface 11 or second main surface 12. An embossing technique can be employed for the formation of asperities by pressing or melting. The melting can be accomplished using a commercially-available laser marker.

In still another exemplary configuration, at least one selected from the first air-permeable fiber layer 3a and the second air-permeable fiber layer 3b is colored, and the color of the first air-permeable fiber layer 3a is different from the color of the second air-permeable fiber layer 3b. For example, a colored non-woven fabric is used as one of the first air-permeable fiber layer 3a and the second air-permeable fiber layer 3b. The colored non-woven fabric can be a non-woven fabric containing a colorant such as a pigment. The non-woven fabric may be colored with a chromatic color. In an example, one of the first air-permeable fiber layer 3a and the second air-permeable fiber layer 3b is constituted by a non-woven fabric colored with a chromatic color while the other is constituted by an uncolored (white) non-woven fabric. Such a configuration also allows distinguishing between the first main surface 11 and the second main surface 12.

EXAMPLES

Hereinafter, the present invention will be described in detail with reference to Examples and Comparative Examples. The present invention is not limited to Examples described below.

<Preparation of First Porous PTFE Membrane A>

A PTFE fine powder ("CD129E", manufactured by Asahi Glass Co., Ltd.; standard specific gravity: 2.16) in an amount of 100 parts by weight was uniformly mixed with 20 parts by weight of a liquid lubricant (dodecane), and the resulting mixture was preformed. Next, the preform was formed into a rod shape by paste extrusion, and the rod-shaped body was passed between a pair of metal pressure rolls to obtain a long sheet with a thickness of 200 μm. The long sheet was stretched in the longitudinal direction at a stretching temperature (furnace temperature) of 375° C. in two stages; the sheet was stretched by a factor of 5 in the first stage and by a factor of 20 in the second stage. The sheet was then stretched by a factor of 7 in the width direction at a stretching temperature (furnace temperature of a tenter) of 320° C. to prepare a first porous PTFE membrane A. The pressure drop across the first porous PTFE membrane A was 15 Pa. The mass per unit area of the first porous PTFE membrane A was 1.3 g/m$^2$.

<Preparation of First Porous PTFE Membrane A1>

A PTFE fine powder ("CD129E", manufactured by Asahi Glass Co., Ltd.) in an amount of 100 parts by weight was uniformly mixed with 20 parts by weight of a liquid lubricant (dodecane), and the resulting mixture was preformed. Next, the preform was formed into a rod shape by paste extrusion, and the rod-shaped body was passed between a pair of metal pressure rolls to obtain a long sheet with a thickness of 200 μm. The long sheet was stretched in the longitudinal direction at a stretching temperature of 375° C. in two stages; the sheet was stretched by a factor of 5 in the first stage and by a factor of 20 in the second stage. The sheet was then stretched by a factor of 7 in the width direction at a stretching temperature of 300° C. to prepare a first porous PTFE membrane A1. The pressure drop across the first porous PTFE membrane A1 was 20 Pa. The mass per unit area of the first porous PTFE membrane A1 was 1.3 g/m$^2$.

<Preparation of First Porous PTFE Membrane A2>

A PTFE fine powder ("CD129E", manufactured by Asahi Glass Co., Ltd.) in an amount of 100 parts by weight was uniformly mixed with 20 parts by weight of a liquid lubricant (dodecane), and the resulting mixture was preformed. Next, the preform was formed into a rod shape by paste extrusion, and the rod-shaped body was passed between a pair of metal pressure rolls to obtain a long sheet with a thickness of 200 μm. The long sheet was stretched in the longitudinal direction at a stretching temperature of 375° C. in two stages; the sheet was stretched by a factor of 4.5 in the first stage and by a factor of 20 in the second stage. The sheet was then stretched by a factor of 6 in the width direction at a stretching temperature of 150° C. to prepare a first porous PTFE membrane A2. The pressure drop across the first porous PTFE membrane A2 was 40 Pa. The mass per unit area of the first porous PTFE membrane A2 was 1.3 g/m$^2$.

<Preparation of First Porous PTFE Membrane B>

A PTFE fine powder ("Fluon (registered trademark) PTFE CD-123", manufactured by Asahi Glass Co., Ltd.) in an amount of 100 parts by weight was uniformly mixed with 19 wt % of a liquid lubricant (naphtha), and the mixture was preformed under a condition of 20 kg/cm$^2$. The resulting preform was then formed into a rod shape by paste extrusion, and the rod-shaped body was passed between a pair of metal pressure rolls to obtain a long sheet with a thickness of 200 μm. This sheet was stretched by a factor of 14 in the longitudinal direction of the sheet at a stretching temperature of 290° C., and the sheet was then stretched by a factor of 30 in the width direction of the sheet at a stretching temperature of 80° C. using a tenter method. An unsintered porous PTFE membrane was thus obtained. This unsintered porous PTFE membrane was heat-treated at 400° C. for 10 seconds with its dimensions fixed. A sintered first porous PTFE membrane B was thus obtained. The pressure drop across the first porous PTFE membrane B was 110 Pa. The mass per unit area of the first porous PTFE membrane B was 0.7 g/m².

<Preparation of First Porous PTFE Membrane C>

A PTFE fine powder ("Fluon (registered trademark) PTFE CD-123", manufactured by Asahi Glass Co., Ltd.) in an amount of 100 parts by weight was uniformly mixed with 19 wt % of a liquid lubricant (naphtha), and the mixture was preformed under a condition of 20 kg/cm². The resulting preform was then formed into a rod shape by paste extrusion, and the rod-shaped body was passed between a pair of metal pressure rolls to obtain a long sheet with a thickness of 200 μm. This sheet was stretched by a factor of 15 in the longitudinal direction of the sheet at a stretching temperature of 290° C., and the sheet was then stretched by a factor of 30 in the width direction of the sheet at a stretching temperature of 80° C. using a tenter method. An unsintered porous PTFE membrane was thus obtained. This unsintered porous PTFE membrane was heat-treated at 400° C. for 10 seconds with its dimensions fixed. A sintered first porous PTFE membrane C was thus obtained. The pressure drop across the first porous PTFE membrane C was 100 Pa. The mass per unit area of the first porous PTFE membrane C was 0.7 g/m².

<Preparation of Second Porous PTFE Membrane D>

A PTFE fine powder ("POLYFLON (registered trademark) PTFE F-104", manufactured by Daikin Industries, Ltd.) in an amount of 100 parts by weight was uniformly mixed with 19 wt % of a liquid lubricant (naphtha), and the mixture was preformed under a condition of 20 kg/cm². The resulting preform was then formed into a rod shape by paste extrusion, and the rod-shaped body was passed between a pair of metal pressure rolls to obtain a long sheet with a thickness of 200 μm. This sheet was stretched by a factor of 35 in the longitudinal direction of the sheet at a stretching temperature of 280° C. and the sheet was then stretched by a factor of 35 in the width direction of the sheet at a stretching temperature of 120° C. using a tenter method. An unsintered porous PTFE membrane was thus obtained. This unsintered porous PTFE membrane was heat-treated at 400° C. for 10 seconds with its dimensions fixed. A sintered second porous PTFE membrane D was thus obtained. The pressure drop across the second porous PTFE membrane D was 80 Pa. The mass per unit area of the second porous PTFE membrane D was 0.7 g/m².

<Preparation of Second Porous PTFE Membrane E>

A PTFE fine powder ("POLYFLON (registered trademark) PTFE F-104", manufactured by Daikin Industries, Ltd.) in an amount of 100 parts by weight was uniformly mixed with 20 parts by weight of a liquid lubricant (dodecane), and the resulting mixture was preformed. Next, the preform was formed into a rod shape by paste extrusion, and the rod-shaped body was passed between a pair of metal pressure rolls to obtain a long sheet with a thickness of 200 μm. The long sheet was stretched by a factor of 18 in the longitudinal direction at a stretching temperature of 280° C. and stretched by a factor of 35 in the width direction at a stretching temperature of 120° C. to prepare a second porous PTFE membrane E. The pressure drop across the second porous PTFE membrane E was 140 Pa. The mass per unit area of the second porous PTFE membrane E was 0.7 g/m².

<Preparation of Second Porous PTFE Membrane F>

A PTFE fine powder ("POLYFLON (registered trademark) PTFE F-104", manufactured by Daikin Industries, Ltd.) in an amount of 100 parts by weight was uniformly mixed with 20 parts by weight of a liquid lubricant (dodecane), and the resulting mixture was preformed. Next, the preform was formed into a rod shape by paste extrusion, and the rod-shaped body was passed between a pair of metal pressure rolls to obtain a long sheet with a thickness of 500 μm. The long sheet was stretched by a factor of 23 in the longitudinal direction at a stretching temperature of 280° C. and stretched by a factor of 35 in the width direction at a stretching temperature of 120° C. to prepare a second porous PTFE membrane F. The pressure drop across the second porous PTFE membrane F was 220 Pa. The mass per unit area of the second porous PTFE membrane F was 2.0 g/m².

<Preparation of Second Porous PTFE Membrane G>

The first porous PTFE membrane B was used as a second porous PTFE membrane G.

<Preparation of Second Porous PTFE Membrane I>

A PTFE fine powder ("POLYFLON (registered trademark) PTFE F-104", manufactured by Daikin Industries, Ltd.) in an amount of 100 parts by weight was uniformly mixed with 19 wt % of a liquid lubricant (naphtha). The resulting mixture was preformed under a condition of 20 kg/cm², and the resulting preform was then formed into a rod shape by paste extrusion. The rod-shaped body was passed between a pair of metal pressure rolls to obtain a long sheet with a thickness of 200 μm. This sheet was stretched by a factor of 37 in the longitudinal direction of the sheet at a stretching temperature of 280° C., and the sheet was then stretched by a factor of 35 in the width direction of the sheet at a stretching temperature of 140° C. using a tenter method. An unsintered porous PTFE membrane was thus obtained. This unsintered porous PTFE membrane was heat-treated at 400° C. for 10 seconds with its dimensions fixed. A sintered second porous PTFE membrane I was thus obtained. The pressure drop across the second porous PTFE membrane I was 60 Pa.

<Air-Permeable Fiber Layer>

A non-woven fabric manufactured by UNITIKA LTD., "ELEVES S0303WDO" (core-sheath structure (core component: PET, sheath component: PE), mass per unit area: 30 g/m², apparent density: 0.136 g/cm³, embossed area ratio: 15%, thickness: 0.22 mm), was used as an air-permeable fiber layer.

<Node Proportion and Average of Areas of Nodes>

Figure 9A:
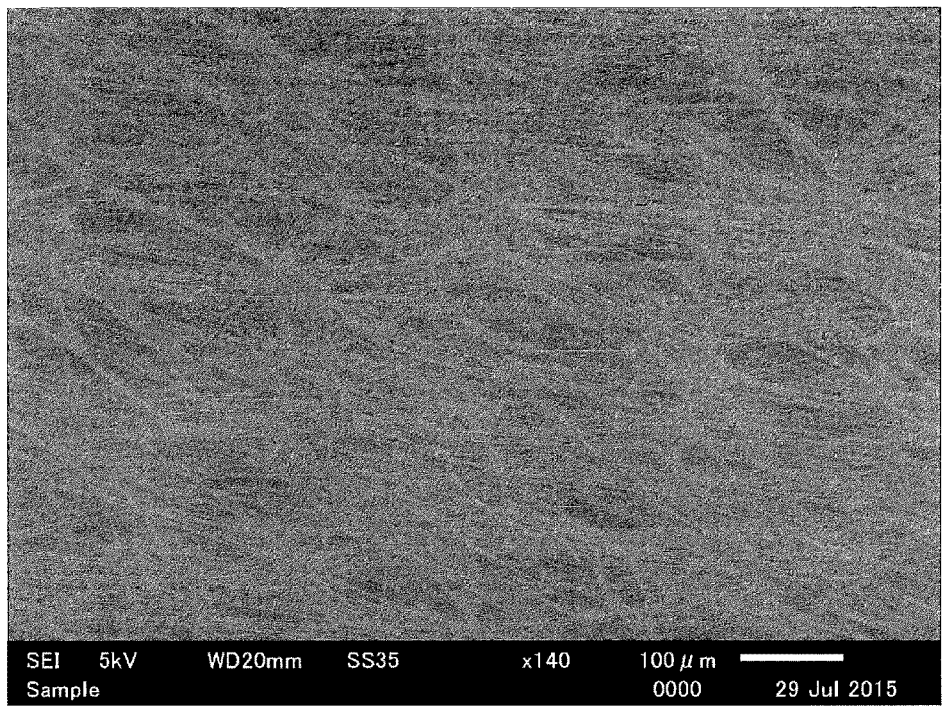
FIG. 9A is a scanning electron microscope (SEM) image of a first porous PTFE membrane A1.
Figure 10A:
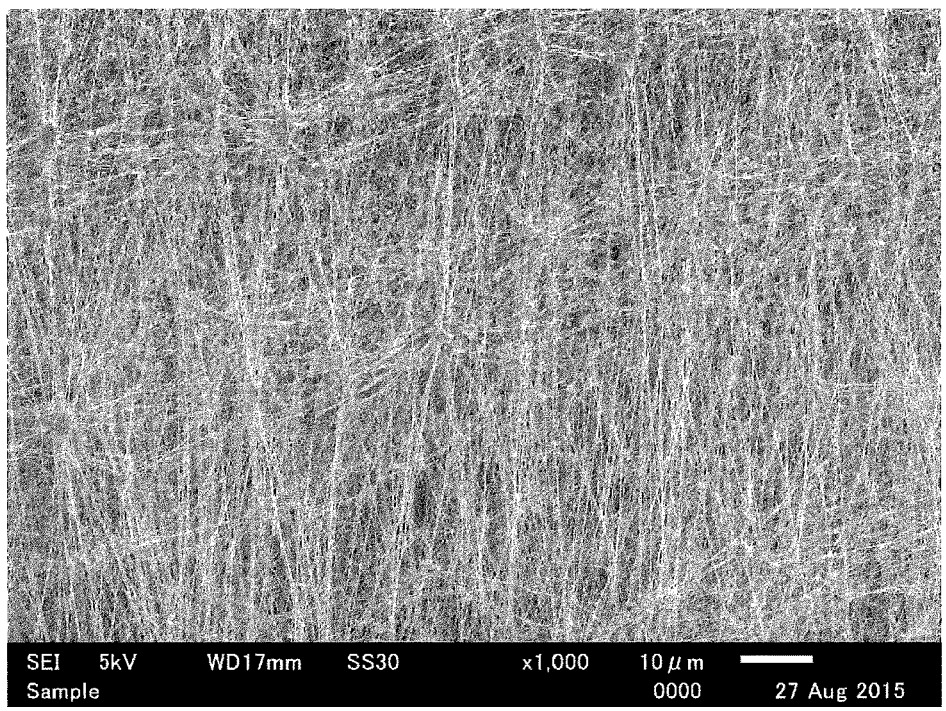
FIG. 10A is a SEM image of a second porous PTFE membrane F.

Surfaces of the first porous PTEF membranes and the second porous PTEF membranes were observed with a scanning electron microscope and images thereof were obtained. An image (magnification of 140 times) of a surface of the first porous PTFE membrane A1 is shown in FIG. 9A. An image (magnification of 1000 times) of a surface of the second porous PTFE membrane F is shown in FIG. 10A.

Figure 9B:
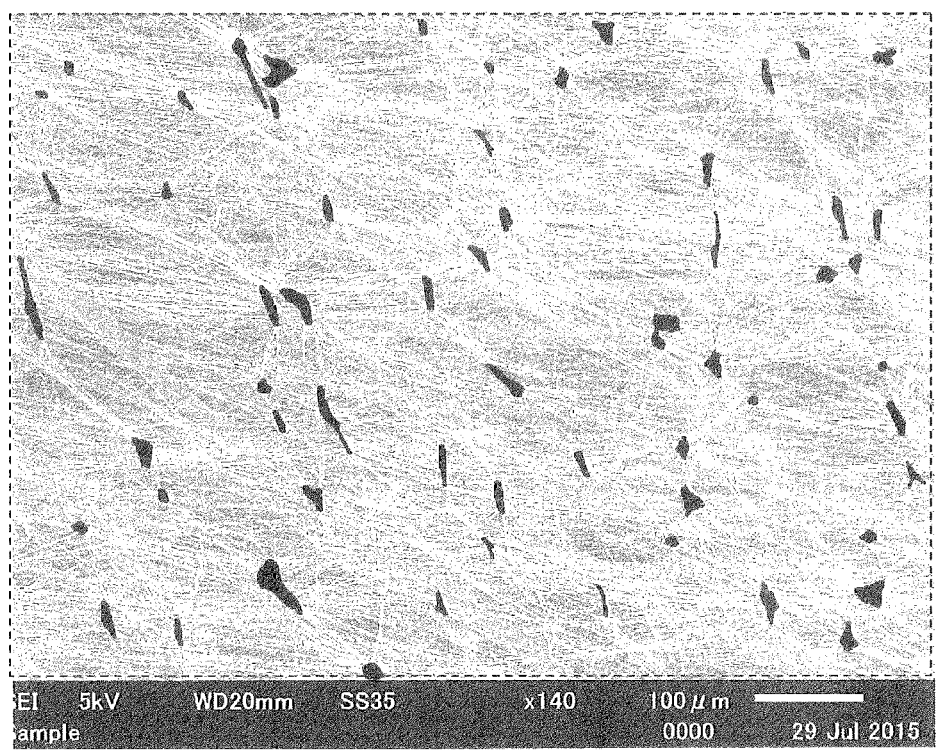
FIG. 9B shows nodes present on the image of FIG. 9A.
Figure 10B:
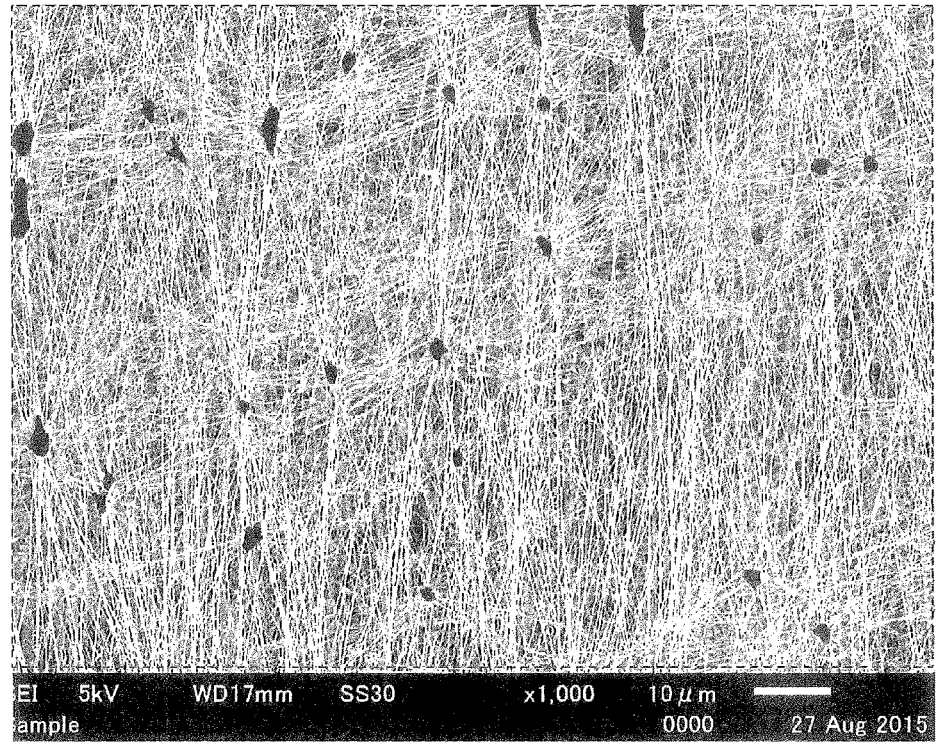
FIG. 10B shows nodes present on the image of FIG. 10A.

Subsequently, nodes on each image were identified. A mass of a fiber, a bundle of fibers, and a portion where fibers overlap with each other were not considered nodes. FIG. 9B shows nodes present on the image of the surface of the first porous PTFE membrane A1. FIG. 10B shows nodes present on the image of the surface of the second porous PTFE membrane F. Moreover, by image processing of each image including the identified nodes, the proportion (node proportion) of the areas occupied by the nodes and the average of the areas of the nodes were determined. The results are shown in Table 1.

Examples 1 to 4 and Comparative Examples 1 and 2

The first porous PTFE membranes, the second porous PTFE membranes, and the above air-permeable fiber layer were combined as shown in Table 1. The first air-permeable fiber layer, the first porous PTFE membrane, the third air-permeable fiber layer, the second porous PTFE membrane, and the second air-permeable fiber layer were stacked in this order, and they were thermally laminated by passing the stack between a pair of rolls heated to 80° C. In this way, air filter media having a multilayer structure as shown in FIG. 6 were produced.

For the air filter media thus obtained, the pressure drop, the amount of collected PAO, the amount of collected NaCl, and the collection efficiency were measured by the following methods.

<Pressure Drop>

Each air filter medium was set in a circular holder with an effective area of 100 cm$^2$. Air was passed through the air filter medium set in the holder, the linear flow velocity of the air passing through the air filter medium was adjusted to 5.3 cm/sec with the aid of a flowmeter, and then the pressure drop was measured with a pressure meter (manometer). For each air filter medium, the pressure drop was measured eight times, and the average of the eight values was calculated.

<Amount of Collected PAO>

Each air filter medium was set in the same device as in the pressure drop measurement. PAO in the form of polydisperse particles with an average particle diameter of 0.15 μm ("Durasyn 164" manufactured by INEOS) was passed through the air filter medium at a concentration of 20 to 40 g/m$^3$ and a linear flow velocity of 5.3 cm/sec using a constant-output aerosol atomizer ("TSI No. 3076" manufactured by TOKYO DYLEC CORP.), and the change in pressure drop was measured with a pressure meter (manometer). The weight (mg) of the air filter medium was measured at a time point where the pressure drop reached 500 Pa. An increase in weight of the air filter medium relative to the weight of the air filter medium that had not been subjected to the pressure drop measurement was divided by the area (m$^2$) of the air filter medium, and the resulting value was further divided by an increase in pressure drop (500− (pressure drop at the start of measurement) (Pa). The value thus obtained was defined as the amount of collected PAO (mg/m$^2$/Pa).

<Amount of Collected NaCl>

Each air filter medium was set in the same device as in the pressure drop measurement. NaCl in the form of polydisperse particles with an average particle diameter of 0.5 μm was passed through the air filter medium at a concentration of 1 to 3 g/m$^3$ and a linear flow velocity of 5.3 cm/sec using a constant-output aerosol atomizer ("TSI No. 3076" manufactured by TOKYO DYLEC CORP.), and the change in pressure drop was measured with a pressure meter (manometer). The weight (mg) of the air filter medium was measured at a time point where the pressure drop reached 500 Pa. An increase in weight of the air filter medium relative to the weight of the air filter medium that had not been subjected to the pressure drop measurement was divided by the area (m$^2$) of the air filter medium, and the resulting value was further divided by an increase in pressure drop (500− (pressure drop at the start of measurement) (Pa). The value thus obtained was defined as the amount of collected NaCl (mg/m$^2$/Pa).

<Collection Efficiency>

Each air filter medium was set in the same device as in the pressure drop measurement, and the linear flow velocity of gas passing through the air filter medium was adjusted to 5.3 cm/sec. Air containing poly-α-olefin (PAO) particles with a particle diameter of 0.1 to 0.2 μm at a concentration of about 1×10$^9$ particles/L was passed through the air filter medium. The concentration of the PAO particles present downstream of the air filter medium was measured with a particle counter, and the collection efficiency (%) was determined by the following equation.

Collection efficiency={1−(downstream concentration of PAO particles/upstream concentration of PAO particles)}×100

TABLE 1

| | | Example 1 | Example 2 | Example 3 | Example 4 | Comparative Example 1 | Comparative Example 2 |
|---|---|---|---|---|---|---|---|
| First porous membrane | Reference sign | A | A1 | A2 | A1 | B | C |
| | Mass per unit area (g/m$^2$) | 1.3 | 1.3 | 1.3 | 1.3 | 0.7 | 0.7 |
| | Node proportion (%) | 1.7 | 2.4 | 2.7 | 2.4 | 0.8 | 0.8 |
| | Average of areas of nodes (μm$^2$) | 200 | 234 | 310 | 234 | 4.8 | 4.8 |
| Second porous membrane | Reference sign | D | E | F | I | G | F |
| | Mass per unit area (g/m$^2$) | 0.7 | 0.7 | 2.0 | 0.7 | 0.7 | 2.0 |
| | Node proportion (%) | 0.8 | 0.9 | 1.0 | 0.9 | 0.8 | 1.0 |
| | Average of areas of nodes (μm$^2$) | 17 | 5 | 4 | 17 | 4.8 | 4 |
| Ratio of node proportion of second porous membrane to node proportion of first porous membrane | | 0.47 | 0.38 | 0.37 | 0.38 | 1 | 1.25 |
| Pressure drop (Pa) | | 95 | 160 | 260 | 80 | 220 | 320 |
| Collection efficiency (%) | | 98 | 99.950 | 99.9995 | 98.371 | 99.995 | 99.9999974 |
| Amount of collected PAO (mg/m$^2$/Pa) | | 121.77 | 71.16 | 74.4 | 21.4 | 5.47 | 8.5 |
| Amount of collected NaCl (mg/m$^2$/Pa) | | 12.66 | 10.10 | 9.62 | 9.0 | 3.52 | 14.5 |

In Examples 1 to 4, the node proportions of the first porous PTFE membranes A, A1, and A2 were 1.7%, 2.4%, and 2.7% respectively, and the node proportions of the second porous PTFE membranes D, E, F, and I were 0.8%, 0.9%, 1.0%, and 0.9% respectively. In Examples 1 to 4, the ratios of the node proportions of the second porous PTFE membranes to the node proportions of the first porous PTFE membranes were 0.47, 0.38, 0.37, and 0.38, respectively. As just described, in Examples 1 to 4, the node proportion of the first porous PTFE membrane greatly exceeded the node proportion of the second porous PTFE membrane.

In Comparative Examples 1 and 2, the node proportions of the first porous PTFE membranes B and C were 0.8% and 0.8% respectively, and the node proportions of the second porous PTFE membranes G and F were 0.8% and 1.0% respectively. In Comparative Examples 1 and 2, the ratios of the node proportions of the second porous PTFE membranes to the node proportions of the first porous PTFE membranes were 1 and 1.25 respectively. As just described, in Comparative Examples 1 and 2, the node proportion of the first porous PTFE membrane was equal to or less than the node proportion of the second porous PTFE membrane.

In Examples 1 to 4, the average areas of the nodes (average values of the areas of the nodes) of the first porous PTFE membranes A, A1, and A2 were very large, namely, 200 $\mu m^2$, 234 $\mu m^2$, and 310 $\mu m^2$ respectively.

When the air filter media of Examples 1 to 4 are compared with the air filter media of Comparative Examples 1 and 2, it is seen that the amount of collected PAO was larger for the air filter media of Examples 1 to 10. That is, the air filter media of Examples 1 to 4 yielded a smaller increase in pressure drop with collection of oil mist and was less clogged with oil mist than the air filter media of Comparative Examples 1 and 2.

INDUSTRIAL APPLICABILITY

The air filter medium of the present invention can be employed for various applications such as use as an intake air filter medium for turbines, use as a filter medium for outdoor air conditioners, use as an air filter medium for clean rooms intended for medical treatment or pharmaceutical operation, use as a filter medium for masks, and use as a filter medium for general home electric appliances. The air filter medium of the present invention is particularly suitable for use as an air filter medium to be subjected to a process such as pleating.

The invention claimed is:

1. An air filter medium comprising a first porous PTFE membrane and a second porous PTFE membrane, wherein
   the air filter medium has a first main surface and a second main surface,
   the first porous PTFE membrane and the second porous PTFE membrane are arranged so that an air flow moving from the first main surface to the second main surface passes through the first porous PTFE membrane and subsequently through the second porous PTFE membrane,
   the first porous PTFE membrane comprises a plurality of nodes and a plurality of fibrils,
   a proportion of areas occupied by the plurality of nodes on a surface of the first porous PTFE membrane is in the range of 1.5 to 3.0%,
   an average of the areas of the plurality of nodes of the first porous PTFE membrane is 200 $\mu m^2$ or more, the average of the areas of the plurality of nodes of the first porous PTFE membrane being defined by a total area occupied by a number of the plurality of nodes of the first porous PTFE membrane divided by the number of the plurality of nodes in the total area,
   the second porous PTFE membrane comprises a plurality of nodes and a plurality of fibrils,
   a proportion of areas occupied by the plurality of nodes on a surface of the second porous PTFE membrane is smaller than the proportion of the areas occupied by the plurality of nodes on the surface of the first porous PTFE membrane,
   the proportion of areas occupied by the plurality of nodes on the surface of the second porous PTFE membrane is in the range of 0.7 to 1.0%,
   the thickness of the first porous PTFE membrane is 7 to 36 $\mu m$ and the thickness of the second porous PTFE membrane is 1 $\mu m$ or more and less than 7 $\mu m$, and
   a porosity of the first porous PTFE membrane is higher than a porosity of the second porous PTFE membrane.

2. The air filter medium according to claim 1, wherein an average of areas of the plurality of nodes of the second porous PTFE membrane is in the range of 3.0 to 20 $\mu m^2$, the average of the areas of the plurality of nodes of the second porous PTFE membrane being defined by a total area occupied by a number of the plurality of nodes of the second porous PTFE membrane divided by the number of the plurality of nodes in the total area.

3. The air filter medium according to claim 1, wherein when poly-α-olefin in the form of polydisperse particles with an average particle diameter of 0.15 $\mu m$ is passed through the air filter medium at a concentration of 20 to 40 $g/m^3$ and a linear flow velocity of 5.3 cm/sec to measure change in pressure drop, an amount of poly-α-olefin collected by the air filter medium is 20 $mg/m^2/Pa$ or more at a time point where the pressure drop reaches 500 Pa.

4. The air filter medium according to claim 1, wherein when NaCl in the form of polydisperse particles with an average particle diameter of 0.5 $\mu m$ is passed through the air filter medium at a concentration of 1 to 3 $g/m^3$ and a linear flow velocity of 5.3 cm/sec to measure change in pressure drop, an amount of NaCl collected by the air filter medium is 8 $mg/m^2/Pa$ or more at a time point where the pressure drop reaches 500 Pa.

5. An air filter pack comprising the air filter medium according to claim 1, the air filter medium being pleated.

6. An air filter unit comprising the air filter pack according to claim 5 and a frame supporting the air filter pack.

7. The air filter medium according to claim 1, wherein the porosity of the first porous PTFE membrane is 90 to 99% and the porosity of the second porous PTFE membrane is 50% or more and less than 90%.

8. The air filter medium according to claim 1, wherein the mass per unit area of the first porous PTFE membrane is larger than the mass per unit area of the second porous PTFE membrane.

9. The air filter medium according to claim 1, further comprising a first air-permeable fiber layer disposed upstream of the first porous PTFE membrane and a second air-permeable fiber layer disposed downstream of the second porous PTFE membrane, wherein
   the mass per unit area of the second air-permeable fiber layer is equal to or smaller than the mass per unit area of the first air-permeable fiber layer.

10. The air filter medium according to claim 9, wherein the mass per unit area of the first air-permeable fiber layer is 30 to 260 $g/m^2$ and the mass per unit area of the second air-permeable fiber layer is 15 to 100 $g/m^2$.

* * * * *